Nov. 5, 1957 H. V. MAY 2,812,381
TERMINAL CONNECTIONS FOR CAN-TYPE CONDENSERS
Filed June 26, 1951

HAROLD V. MAY
INVENTOR.

BY Arthur G. Connolly
HIS ATTORNEY

United States Patent Office 2,812,381
Patented Nov. 5, 1957

2,812,381

TERMINAL CONNECTIONS FOR CAN-TYPE CONDENSERS

Harold V. May, Pittsfield, Mass., assignor to Sprague Electric Company, a corporation of Massachusetts Application June 26, 1951, Serial No. 233,652

5 Claims. (Cl. 174—153)

This invention relates to new and improved terminal connections for can-type condensers.

There has existed a considerable problem in the prior art type of terminal, caused by these terminals working loose from their supporting surfaces when leads are tightened on them. The loose joints resulting from this are frequently instrumental in condenser failure because of moisture entering the condenser through the joint.

It is an object of this invention to produce a new and improved type of terminal adapted to be inserted into the side walls of the can-type condenser, which will overcome the difficulties indicated above.

Figure 1:
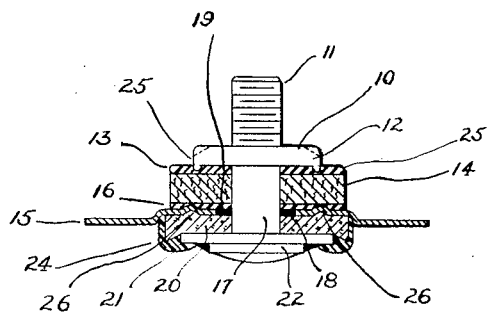
Figure 2:
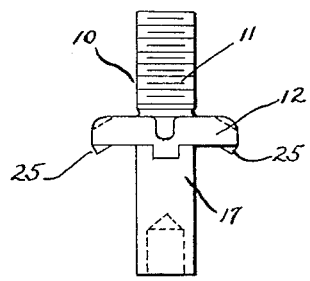
Figure 3:
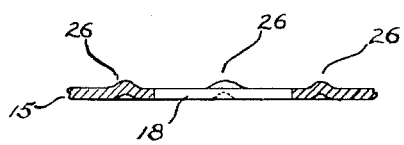

In the drawings Fig. 1 shows a cross section view of a terminal inserted into the wall of a condenser unit; Fig. 2 illustrates the central terminal element of the connection; and Fig. 3 shows the manner in which the wall of the condenser unit is formed in accordance with this invention; and Fig. 4 pictures a further modification of the terminal formed in accordance with this invention.

Specifically in Fig. 1, 10 designates a terminal element provided with suitable threads 11 used in attaching leads to the condenser unit. Flange 12 is provided on the terminal 10 and bears against a thin resilient neoprene washer 13, which in turn, bears against a spacer 14. This spacer is separated from the wall of the condenser can 15 by a second resilient neoprene washer 16. The central portion 17 of the terminal element 10 projects through a hole 18 in the wall 15. The space between the central portion 17 and the wall 15 is filled with neoprene as shown at 19.

Inside the wall 15 a resilient cork gasket 20 bears between a metallic washer 21 riveted on the central shaft 17 and the wall 15. This washer 21 is held in position on the copper washer 22 and the riveted joint 23. The internal connection of the condenser unit and the terminal is made to either the copper washer 22 or the riveted end 23 or to any suitable means which may be inserted in place of the washer 22. A layer of paint or a phenolic resin 24 is applied to the inside exposed surface of the cork gasket 20 in order to protect it from corrosive elements present in the condenser unit.

As is seen in Fig. 2 the flange 12 of the terminal 10 is provided with a series of projections 25 on the side of the flange away from the threads 11. In operation, these projections bite into the neoprene layer 13 tending to prevent slippage between the flange and this layer.

A similar group of projections 26 shown in Fig. 3 are provided upon the can 15 in order to bite into the neoprene gasket 16, and to tend to hold the cork layer 20 in position.

Figure 4:
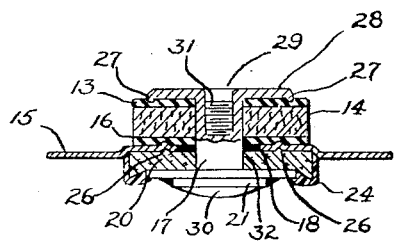

The assembly shown in Fig. 4 differs from the assembly pictured in Fig. 1 in that rivet 32 is positioned within the condenser wall 15 so that the head of the rivet 30 is positioned internally in the condenser unit. A washer 21 is used under the rivet head 30 to bear against the cork washer 20. The end of the rivet 32 remote from the head 30 is formed into a flange 28 containing preferably projections 27 which bite into the neoprene washer 13. The center portion 17 of the other end of the rivet 32 is furnished with an aperture 29 tapped internally at 31 in order to provide internal attaching means for the entire terminal. It is readily seen that this modification is desirable in that projections 27 can be formed with the riveting operation, and that the threads 31 are not apt to be damaged in handling the condenser. This modification is easier to rivet than the modification shown in Fig. 1 because the end of the rivet opposite the head is positioned externally of the condenser container. As is seen, parts shown in Fig. 4, which are the same as in Fig. 1, have been designated by like characters.

The combined structures shown in Figs. 1 and 4 of the drawings are highly desirable because the friction between the various elements or washers and the projections indicated is sufficient to prevent the unit 10 from turning as various attaching elements are connected at 11 or 31. These units are capable of withstanding more than 20 inch-pounds of torque, whereas, units formed according to the prior art could only withstand a maximum of 4 to 6 inch-pounds of torque. By virtue of the construction set forth it is virtually impossible for a leak to arise in the terminal connection forming the subject matter of this invention.

It is to be understood that the invention set forth is broader than the specific gasket and sealing materials set forth. It is within the ability of the art to substitute other materials having the desirable properties of the specific materials used. For example, rubber may be substituted for neoprene in the gaskets 13 and 14. Various modifications in the structure can be made without departing from the teachings of this invention provided these modifications are within the scope of the appended claims.

What is claimed is:

1. A moisture-resisting, electrically-insulated terminal construction comprising a housing wall defining an aperture, a plurality of embossments on said wall spaced from and surrounding said aperture and so formed as to provide projections on one side of said wall and indentations on the other side of said wall, a rivet having a threaded end extending through said aperture, a radial flange integral with said rivet and positioned outside of said housing wall, projections on said flange facing said wall and facing away from said threaded end, a first gasket extending around said rivet and engaging said flange projections, an insulating spacer on said rivet positioned on the housing side of said first gasket, a second gasket positioned between said insulating spacer and said housing wall and engaging said projections on said wall, a third gasket positioned on said rivet internally of said wall, a washer about the end of said rivet within said housing wall and positioned against said third gasket, said rivet being headed over and clamping all of said members together and against the housing wall to dig said projections into the gaskets they engage and squeeze said third gasket into the indentations to thereby cause the assembly to resist rotation.

2. A terminal construction as set forth in claim 1 wherein a layer of protective resin covers the exposed portions of said third gasket.

3. A moisture-resisting terminal connection for hermetically sealed electrical circuit components comprising a housing wall defining an aperture, projections on said wall surrounding said aperture, identations on said wall opposite said projections, a rivet extending through said aperture, the head of said rivet bearing against a gasket positioned internally of said wall, a second gasket positioned externally against said wall on said rivet and engaging said projections, an insulating spacer positioned on said rivet bearing against said second gasket, a third gasket positioned on said rivet bearing against said insulating spacer, a radial flange integral with said rivet and having a face bearing against said third gasket, said face having projections engaging said third gasket and threaded means tapped internally of said rivet at the end of said rivet next to said flange, the rivet head clamping the assembly together to dig the projection into the gaskets they engage and squeezing the internally positioned gasket into the indentations, to thereby cause the assembly to resist rotation.

4. A moisture-resisting terminal construction for hermetically sealed electrical components which comprises a housing wall defining an aperture, a series of stamped bosses on said wall surrounding said aperture and providing opposed depressions, a rivet extending through said aperture, a radial flange integral with the rivet and positioned outside the wall, the rivet having a threaded anchoring post beyond the flange, and the flange having projections facing the housing wall, a first gasket encircling said rivet and positioned externally against said flange and its projections, an insulating spacer encircling said rivet and bearing against said gasket, a second gasket encircling said rivet between the wall and said insulating spacer and engaging the wall projections, a third gasket encircling said rivet and bearing against the inside surface of said wall and the depressions in said wall surface, said rivet being headed over at its inner end so as to clamp all of said members together and against the housing wall to dig said projections into the gaskets they engage and squeeze the third gasket into the wall depressions to thereby cause the assembly to resist rotation.

5. The terminal construction of claim 1 in which the apertured edge is spaced from the rivet and a sealing layer is inserted in this space.

References Cited in the file of this patent

UNITED STATES PATENTS

| | | |
|---|---|---|
| 2,242,784 | Hartzell | May 20, 1941 |
| 2,281,839 | Hagerty | May 5, 1942 |
| 2,304,334 | Boucher et al. | Dec. 8, 1942 |
| 2,374,084 | Dubilier | Apr. 17, 1945 |
| 2,443,545 | Schwennesen | June 15, 1948 |
| 2,456,118 | Foster | Dec. 14, 1948 |
| 2,602,349 | Manning | July 8, 1952 |

FOREIGN PATENTS

| | | |
|---|---|---|
| 110,607 | Sweden | May 16, 1944 |